(12) United States Patent
Yoshida et al.

(10) Patent No.: US 11,417,038 B2
(45) Date of Patent: Aug. 16, 2022

(54) NON-TRANSITORY COMPUTER-READABLE MEDIUM INCLUDING FIGURE DATA GENERATION PROGRAM

(71) Applicant: DGSHAPE Corporation, Hamamatsu (JP)

(72) Inventors: Makoto Yoshida, Hamamatsu (JP); Yoshimitsu Asahina, Hamamatsu (JP)

(73) Assignee: DGSHAPE CORPORATION, Shizuoka (JP)

( * ) Notice: Subject to any disclaimer, the term of this patent is extended or adjusted under 35 U.S.C. 154(b) by 40 days.

(21) Appl. No.: 16/679,416

(22) Filed: Nov. 11, 2019

(65) Prior Publication Data

US 2020/0151929 A1 May 14, 2020

(30) Foreign Application Priority Data

Nov. 14, 2018 (JP) .............................. JP2018-214157

(51) Int. Cl.
*G06T 11/60* (2006.01)
*G06T 11/20* (2006.01)
*G05B 19/4097* (2006.01)

(52) U.S. Cl.
CPC .......... *G06T 11/60* (2013.01); *G05B 19/4097* (2013.01); *G06T 11/203* (2013.01); *G05B 2219/35012* (2013.01)

(58) Field of Classification Search
None
See application file for complete search history.

(56) References Cited

U.S. PATENT DOCUMENTS

| 9,965,897 B2* | 5/2018 | Ryznar | G06F 3/011 |
| 2008/0310747 A1* | 12/2008 | Anderson | G06T 15/02 |
| | | | 382/249 |
| 2016/0240011 A1* | 8/2016 | Fedosov | G06F 3/011 |
| 2017/0057008 A1* | 3/2017 | Liu | H04N 7/183 |
| 2018/0113598 A1* | 4/2018 | Linder | G05B 19/4062 |
| 2018/0129276 A1* | 5/2018 | Nguyen | G06F 3/011 |

OTHER PUBLICATIONS

Leutert, Florian, Christian Herrmann, and Klaus Schilling. "A spatial augmented reality system for intuitive display of robotic data." 2013 8th ACM/IEEE International Conference on Human-Robot Interaction (HRI). IEEE, 2013. (Year: 2013).*
Zaeh, Michael F., and Wolfgang Vogl. "Interactive laser-projection for programming industrial robots." 2006 IEEE/ACM International Symposium on Mixed and Augmented Reality. IEEE, 2006. (Year: 2006).*
Sea Force Co., Ltd., "Features and Functions of magic", http://www.seaforce.co.jp/pdf/magic_catalog2015.pdf, retrieval date Oct. 11, 2018, 6 pages.

* cited by examiner

*Primary Examiner* — Sultana M Zalalee
(74) *Attorney, Agent, or Firm* — Keating & Bennett, LLP

(57) ABSTRACT

A non-transitory computer-readable medium includes a figure data generation program to cause a computer to execute a first process of displaying a drawing screen to make/edit an intended figure, a second process of commanding a processor to draw the intended figure on a surface of a workpiece to project a visible light onto a predetermined position on the surface, the processor including a visible-light source, the predetermined position having been designated by a user, and a third process of presenting a position corresponding to the predetermined position in the drawing screen.

4 Claims, 17 Drawing Sheets

FIGURE INFORMATION

| KIND INFORMATION | ATTRIBUTE INFORMATION |
|---|---|
| CHARACTER STRING | CHARACTER STRING ID |
| | POSITION |
| | SIZE |
| | ORIENTATION |
| | FONT |
| | WITH OR WITHOUT FILL |
| | THICKNESS |
| | ⋮ |
| SHAPE | SHAPE ID |
| | POSITION |
| | SIZE |
| | ORIENTATION |
| | WITH OR WITHOUT FILL |
| | ⋮ |
| SYMBOL | SYMBOL ID |
| | POSITION |
| | SIZE |
| | ORIENTATION |
| | WITH OR WITHOUT FILL |
| | ⋮ |

FIG. 5

NON-TRANSITORY COMPUTER-READABLE MEDIUM INCLUDING FIGURE DATA GENERATION PROGRAM

CROSS REFERENCE TO RELATED APPLICATIONS

This application claims the benefit of priority to Japanese Patent Application No. 2018-214157 filed on Nov. 14, 2018. The entire contents of this application are hereby incorporated herein by reference.

BACKGROUND OF THE INVENTION

1. Field of the Invention

The present invention relates to a non-transitory computer-readable medium including figure data generation programs.

2. Description of the Related Art

Machining systems including a machining device and a computer are known. The machining device is for machining a surface of a workpiece to draw, for example, a figure. A user makes/edits a figure that is drawn, on a drawing screen displayed on a display device of the computer. The machining device performs machining based on a figure data corresponding to the figure that has been made/edited. In such machining devices, a technique of making, in advance, a presentation of a machining area on the surface before the machining is performed is known.

For example, a machining device that makes a display of a machining area by projecting a beam or beams of visible light using a laser pointer before machining a surface of the workpiece is disclosed in a document (retrieved on Oct. 11, 2018 from the Internet at: http://www.seaforce.co.jp/pdf/magic_catalog2015.pdf) by Sea Force CO., Ltd.

However, in conventional machining systems, it is impossible to understand correspondences between positions on a drawing screen and positions on a surface or surfaces of each workpiece. Thus, for example, it is difficult to draw a figure that has been made on the drawing screen, at a desired position or in a desired area on the surface of the workpiece.

SUMMARY OF THE INVENTION

Preferred embodiments of the present invention provide non-transitory computer-readable media each including a figure data generation program with which correspondences between positions on a drawing screen and positions on a surface of a workpiece are able to be understood.

According to a preferred embodiment of the present invention, a non-transitory computer-readable medium includes a figure data generation program to cause a computer to execute a first process of displaying a drawing screen to make/edit an intended figure; a second process of commanding a machining device to draw the intended figure on a surface of a workpiece to project a visible light onto a predetermined position on the surface, the machining device having a visible-light source, the predetermined position having been designated by a user; and a third process of presenting a position corresponding to the predetermined position in the drawing screen. Other features and preferred embodiments of the present invention are disclosed in the description of the present specification.

According to preferred embodiments of the present invention, it is possible to understand correspondences between positions on the drawing screen to make/edit a figure that is drawn on a surface of a workpiece and positions on that surface.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 5 is a diagram for explaining figure information according to a preferred embodiment of the present invention.

DETAILED DESCRIPTION OF THE PREFERRED EMBODIMENTS

Figure 1:
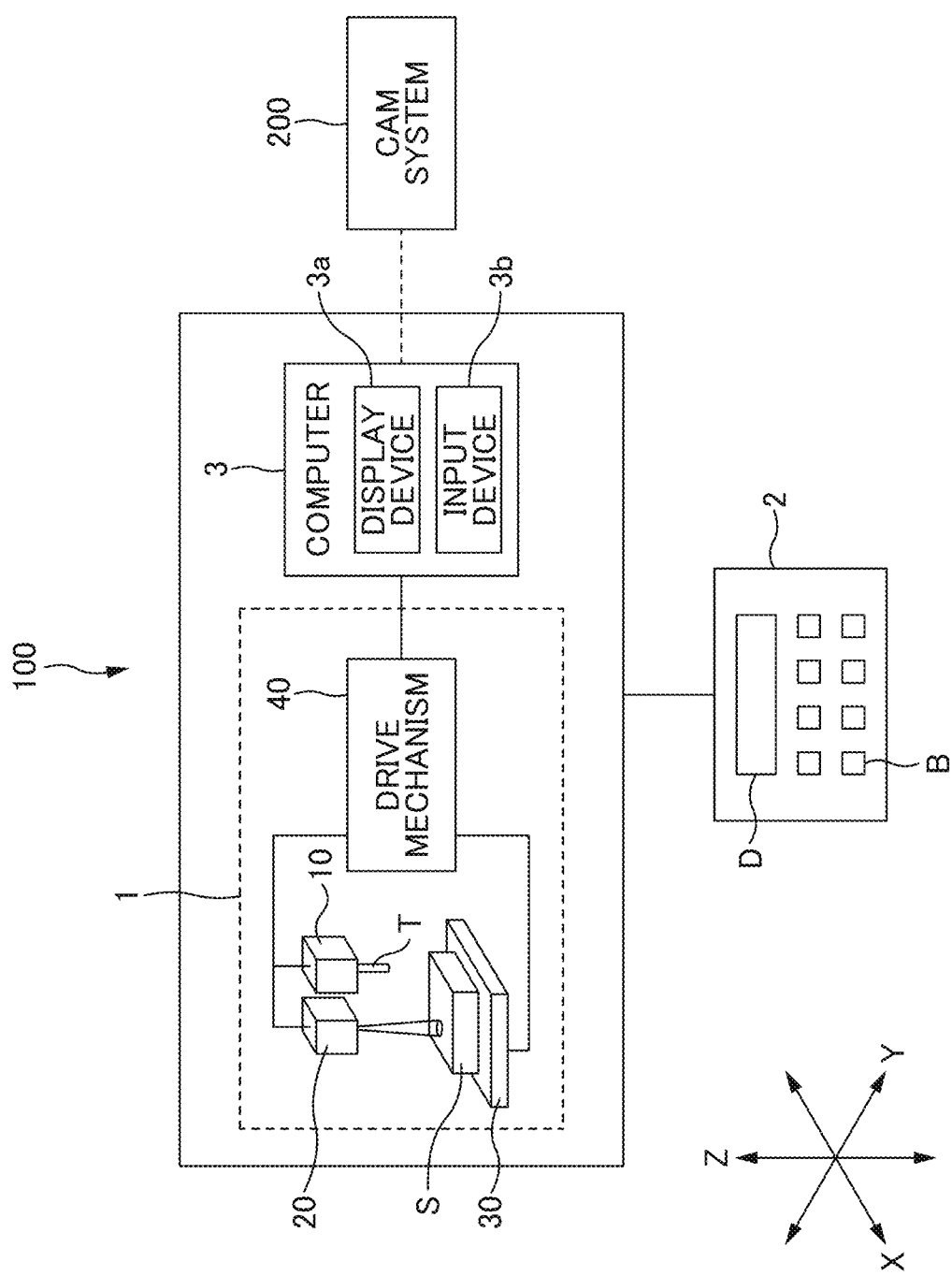
FIG. 1 is a schematic diagram illustrating a machining system and a CAM system according to a preferred embodiment of the present invention.

FIG. 1 is a diagram showing a machining system 100 and a CAM system 200. A machining method according to this preferred embodiment can be performed by the machining system 100 and the CAM system 200.

The machining system 100 includes a processor 1, an operation panel 2, and a computer 3. The machining system 100, however, may include the processor 1 and the operation panel 2 when the functions of the computer 3 are achieved by the processor 1.

The processor 1 is configured or programmed to draw an intended figure on a surface of a workpiece S by cutting the surface with a machining tool T along a machining path. The processor 1 is configured or programmed to include a grasp unit 10, a visible-light source 20, a holding unit 30, and a drive mechanism 40. The grasp unit 10 grasps the machining tool T used for cutting. The visible-light source 20 projects a beam or beams of visible light onto a surface of the workpiece S. As the visible-light source 20, for example, a laser pointer can be used. The holding unit 30 holds the workpiece S. The drive mechanism 40 moves, three-dimensionally, at least one of the grasp unit 10, the visible-light source 20, and the holding unit 30.

The operation panel 2 is used to enter command inputs to the processor 1 and the computer 3. The operation panel 2 is provided with a display D and multiple buttons B. In the example shown in FIG. 1, eight buttons B are shown. The number of the buttons B is not limited thereto. In addition, in place of some of the buttons B, for example, a jog dial may be provided.

In this preferred embodiment, the visible-light source 20 operates based on command input from the operation panel 2. The operation of the visible-light source 20 means movement of the visible-light source 20 relative to the holding unit 30, outputs of visible light, or the like.

The computer 3 controls operations of the processor 1. The computer 3 includes a display device 3a such as a display, and an input device 3b such as a keyboard or a mouse.

The computer 3 in this preferred embodiment has a figure data generation program that is pre-installed thereon. The figure data generation program is used in generating figure data that is drawn on a surface of the workpiece S (detailed are described later).

The CAM system 200 is used to generate machining path data. The machining path data are used to draw an intended figure by machining a surface of the workpiece S. Each of the machining path data includes multiple point data. Each of the point data has two-dimensional (x- and y-) coordinates. The two-dimensional (x- and y-) coordinates represent coordinates on a machining path.

In the case that a figure is drawn on a surface of a material using the processor 1, a user makes, in advance, a figure that is drawn. A figure data generation program according to this preferred embodiment is executed by the computer 3 at that time. In this preferred embodiment, the figure data generation program causes the computer 3 to execute first to fifth processes.

The first process is used to display a drawing screen to make/edit intended figures.

For example, the user gives a command to display the drawing screen via the input device 3b. In response to this command, the computer 3 executes the figure data generation program. First, the computer 3 retrieves image data for the drawing screen which is stored in a memory (not shown) and displays the drawing screen on the display device 3a. The user can make/edit an intended figure on the drawing screen via the input device 3b.

The second process is used to command the processor 1 to project a beam of visible light onto a predetermined position on a surface of the workpiece S which has been designated by the user.

In making/editing a figure, the user may want to understand where on the drawing screen a certain position on the surface of the workpiece S is located.

Figure 2:
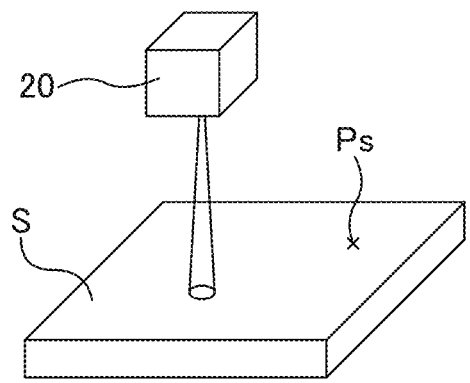
FIG. 2 is a diagram for explaining a second process according to a preferred embodiment of the present invention.
Figure 3A:
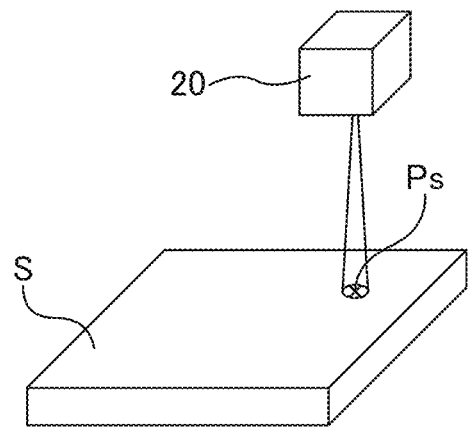
FIG. 3A is a diagram for explaining the second process according to a preferred embodiment of the present invention.

In this case, the user designates a single point on the workpiece S via the operation panel 2. Specifically, the user designates certain coordinates via the operation panel 2. In this case, the computer 3 executes the second process. That is, the computer 3 identifies a predetermined position Ps (see FIG. 2) corresponding to the designated coordinates. Then, the computer 3 commands the processor 1 to project a beam of visible light onto the predetermined position Ps on the surface of the workpiece S. Based on the command from the computer 3, the processor 1 moves at least one of the visible-light source 20 and the holding unit 30 and projects a beam of visible light onto the predetermined position Ps (see FIG. 3A).

The third process is used to present a position corresponding to the predetermined position in the drawing screen.

Figure 3B:
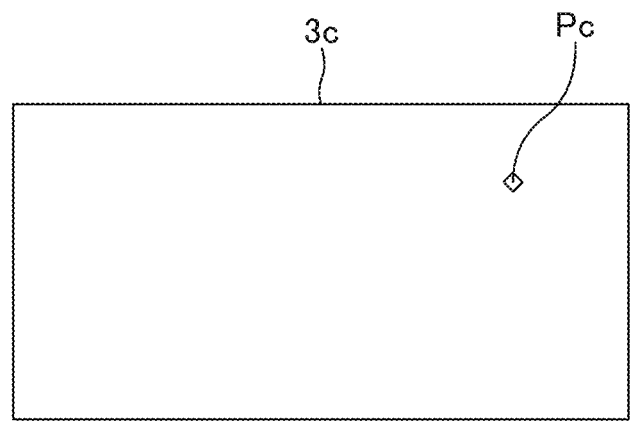
FIG. 3B is a diagram for explaining a third process according to a preferred embodiment of the present invention.

After the beam of visible light is projected onto the predetermined position Ps on the surface of the workpiece S in the second process, the computer 3 executes the third process. That is, the computer 3 identifies a position on a drawing screen 3c corresponding to the predetermined position Ps. Then, the computer 3 allows the identified position Pc to be presented on the drawing screen 3c (see FIG. 3B). In the example shown in FIG. 3B, the position Pc is presented with a diamond shape.

The fourth process is used to detect the predetermined position on the drawing screen which has been designated by the user.

In making/editing a figure, the user may want to understand where on the surface of the workpiece S a certain position on the drawing screen 3c is located.

Figure 4A:
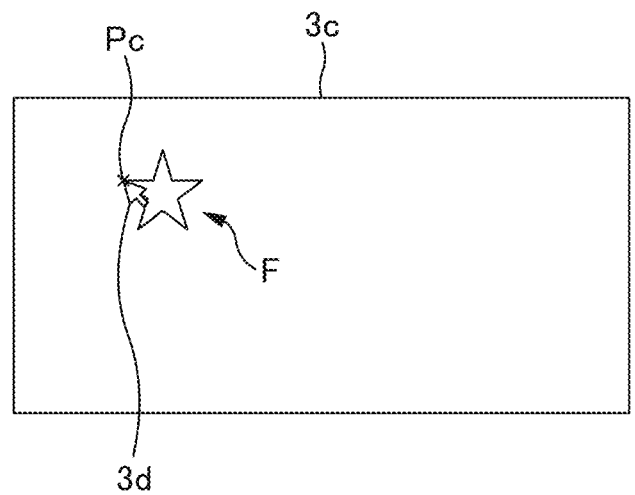
FIG. 4A is a diagram for explaining a fourth process according to a preferred embodiment of the present invention.

In this case, the user designates a single point on the drawing screen 3c via the operation panel 2. Specifically, the user designates a single point (position Pc) on a star shape F that has been made, by moving a cursor 3d across the drawing screen 3c via the operation panel 2 (see FIG. 4A). In this case, the computer 3 executes the fourth process. That is, the computer 3 detects the predetermined position Pc that has been designated. The predetermined position Pc is detected as coordinates in the drawing screen 3c.

The fifth process is used to command the processor 1 to project a beam of visible light onto a position corresponding to the predetermined position, on the surface of the workpiece.

Figure 4B:
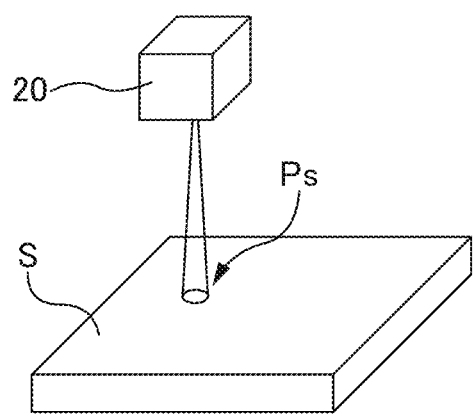
FIG. 4B is a diagram for explaining a fifth process according to a preferred embodiment of the present invention.

In the case that the position Pc on the drawing screen 3c is detected in the fourth process, the computer 3 executes the fifth process. That is, the computer 3 identifies a position Ps on the surface of the workpiece S which corresponds to the designated position Pc. The computer 3 then commands the processor 1 to project a beam of visible light onto the position Ps on the surface of the workpiece S. Based on the command from the computer 3, the processor 1 moves, three-dimensionally, at least one of the visible-light source 20 and the holding unit 30 and projects a beam of visible light onto the predetermined position Ps (see FIG. 4B).

In response to a command input from the user, the computer 3 executes the figure data generation program and appropriately executes the first to fifth processes.

The above-mentioned preferred embodiment has been described in terms of a case where the figure data generation program causes the computer 3 to execute the first to fifth processes. The figure data generation program may, however, be provided as the one that executes some of the processes. Specifically, the figure data generation program may be a program that executes the first to third processes. Alternatively, the figure data generation program may be a program that executes the first, fourth, and fifth processes.

In the case that the user ends his making/editing a figure, the computer 3 acquires a figure data. Each figure data represents an intended figure that is to be drawn on a surface of the workpiece S. Examples of the intended figure include a character, a shape, a symbol and so on or any combinations of two or more of them.

The figure data includes figure information. The figure information is set for each of the figures included in the intended figure. As shown in FIG. 5, each figure information includes kind information and attribute information. The kind information and attribute information are associated with each other. The kind information is, for example, a character string, a shape, a symbol or the like.

When the kind information is a character string, information representing, for example, "character string ID," "position at which the character string is drawn," "size," "orientation," "font," "thickness of each character," and "with or without fill" belong to the attribute information associated with that kind information. The character string ID is an identifier to specify a character string that should be drawn. The character string ID may be a character string which is the same as the character string that is to be drawn.

When the kind information is a shape, information representing, for example, "shape ID," "position at which the shape is drawn," "size," "orientation," and "with or without fill" belong to the attribute information associated with that kind information. The shape ID is an identifier for specifying a shape that is to be drawn. For example, the shape ID is an identifier for specifying a shape such as a circle, a triangle, or a star-shape.

When the kind information is a symbol, information representing, for example, "symbol ID," "position at which the symbol is drawn," "size," "orientation," and "with or without fill" belong to the attribute information associated with that kind information. The symbol ID is an identifier for specifying a symbol that is to be drawn. For example, the symbol ID is an identifier for specifying a symbol such as an arrow, a music note symbol, or a postal mark.

The computer 3 outputs the generated figure data to the CAM system 200. The CAM system 200 generates a machining path data as described below based on the figure data, and outputs the machining path data to the computer 3.

The computer 3 controls, based on the machining path data generated by the CAM system 200, the drive mechanism 40 and moves at least one of the grasp unit 10 and the holding unit 30. As a result, the surface of the workpiece S on the holding unit 30 is cut with the machining tool T grasped by the grasp unit 10 and the intended figure is thus drawn on the surface of the workpiece S.

Here, before the actual machining, a machining preview may be executed. Machining Preview is a technique of presenting, in advance, a figure or the like that is drawn on the surface of the workpiece S before performing machining. The machining preview can be executed by the figure data generation program.

Specifically, the figure data generation program causes, before the intended figure is drawn on the surface of the workpiece S by the processor 1, a process of commanding the processor 1 to make a machining preview of at least a part of the intended figure to be executed by the processor 1 by projecting a beam of visible light onto a position at which at least a part of the intended figure is drawn. The process of commanding the processor 1 to make a machining preview corresponds to the "sixth process."

Specifically, in response to the command of machining preview, the computer 3 controls the drive mechanism 40 and moves at least one of the holding unit 30 and the visible-light source 20 so that beams of visible light are projected onto positions represented by the machining path data, on the surface of the workpiece S, by executing the figure data generation program. Thus, by the beam of visible light projected onto the position at which the intended figure is drawn, on the surface of the workpiece S, a machining preview is made. As a result, the user can view and recognize the position at which the intended figure is to be drawn, on the surface of the workpiece S.

Figure 6:
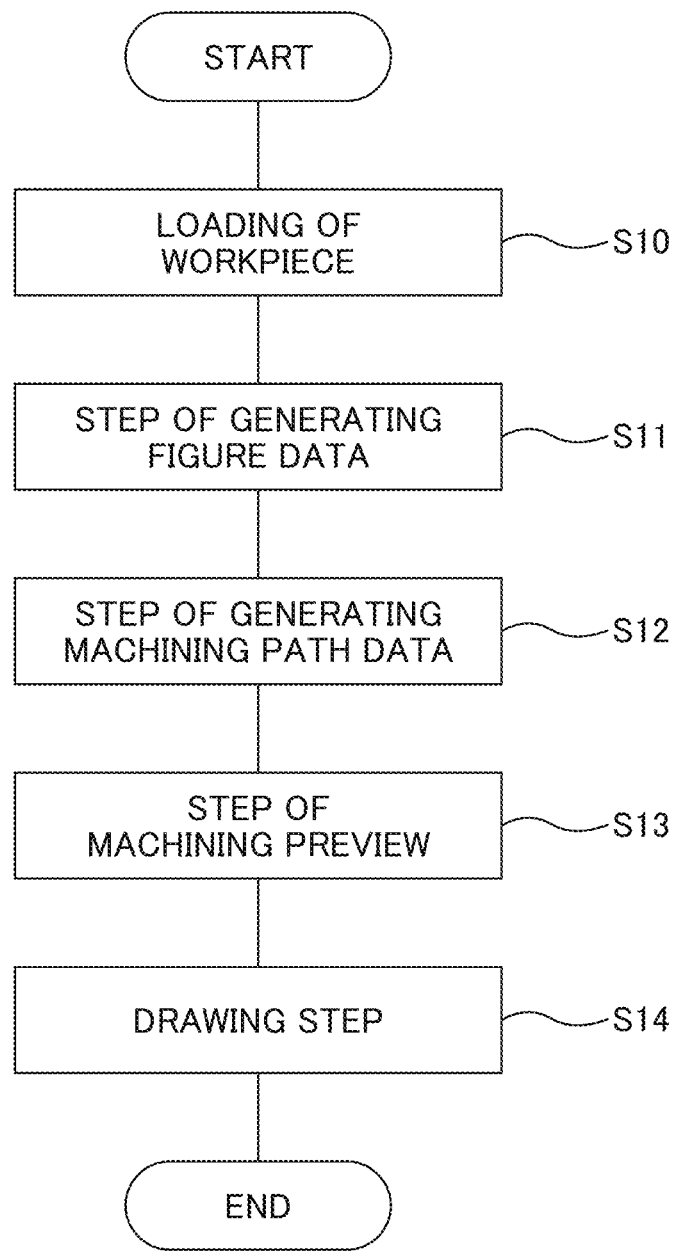
FIG. 6 is a flowchart for explaining a machining method according to a preferred embodiment of the present invention.

Next, a specific example of machining using the machining system 100 is described. A machining method is performed by the machining system 100 and the CAM system 200. FIG. 6 is a flowchart for explaining a machining method according to this preferred embodiment. The machining method according to this preferred embodiment includes steps of generating a figure data, generating a machining path data, making a machining preview, and drawing a figure.

Figure 7:
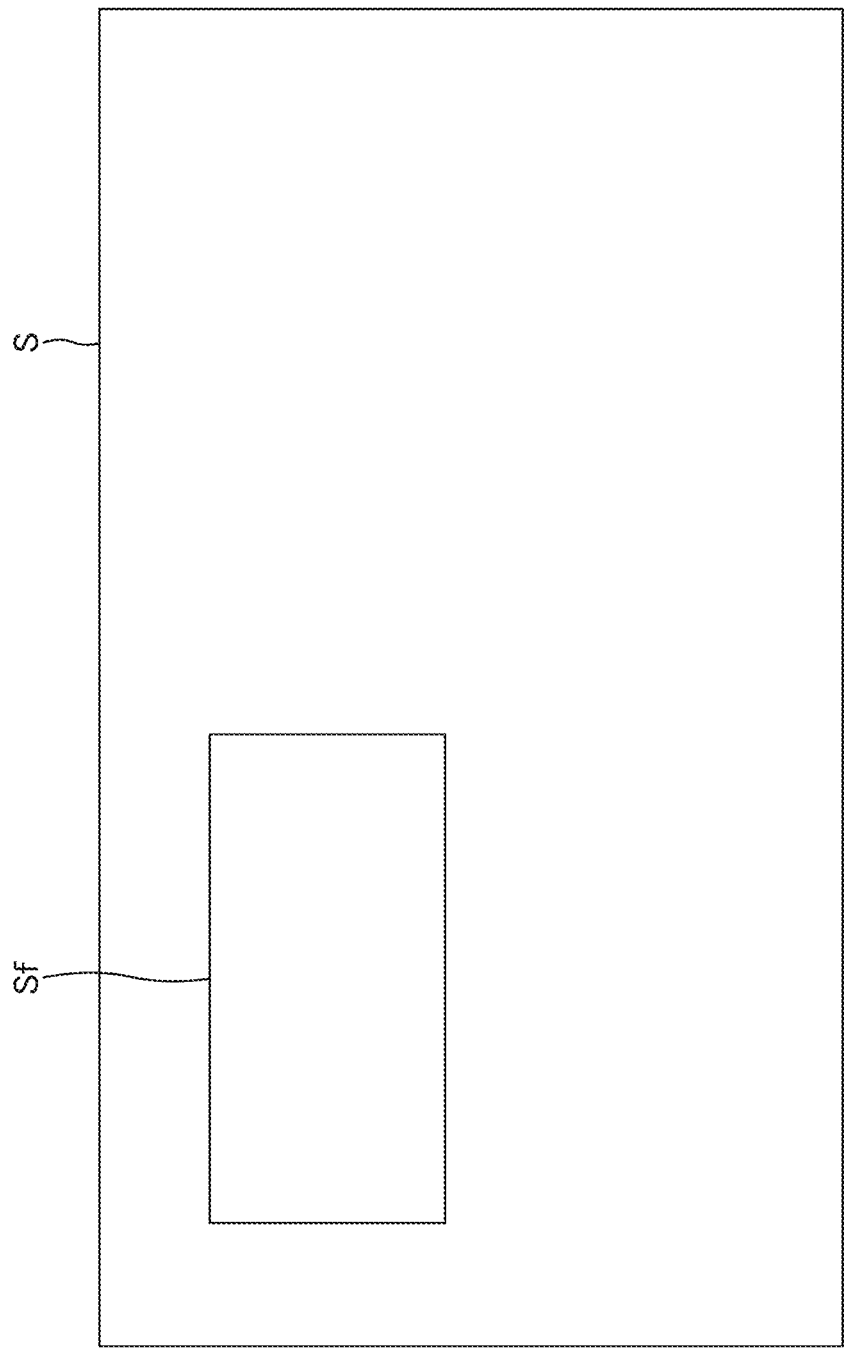
FIG. 7 is a diagram for explaining a machining method according to a preferred embodiment of the present invention.
Figure 8:
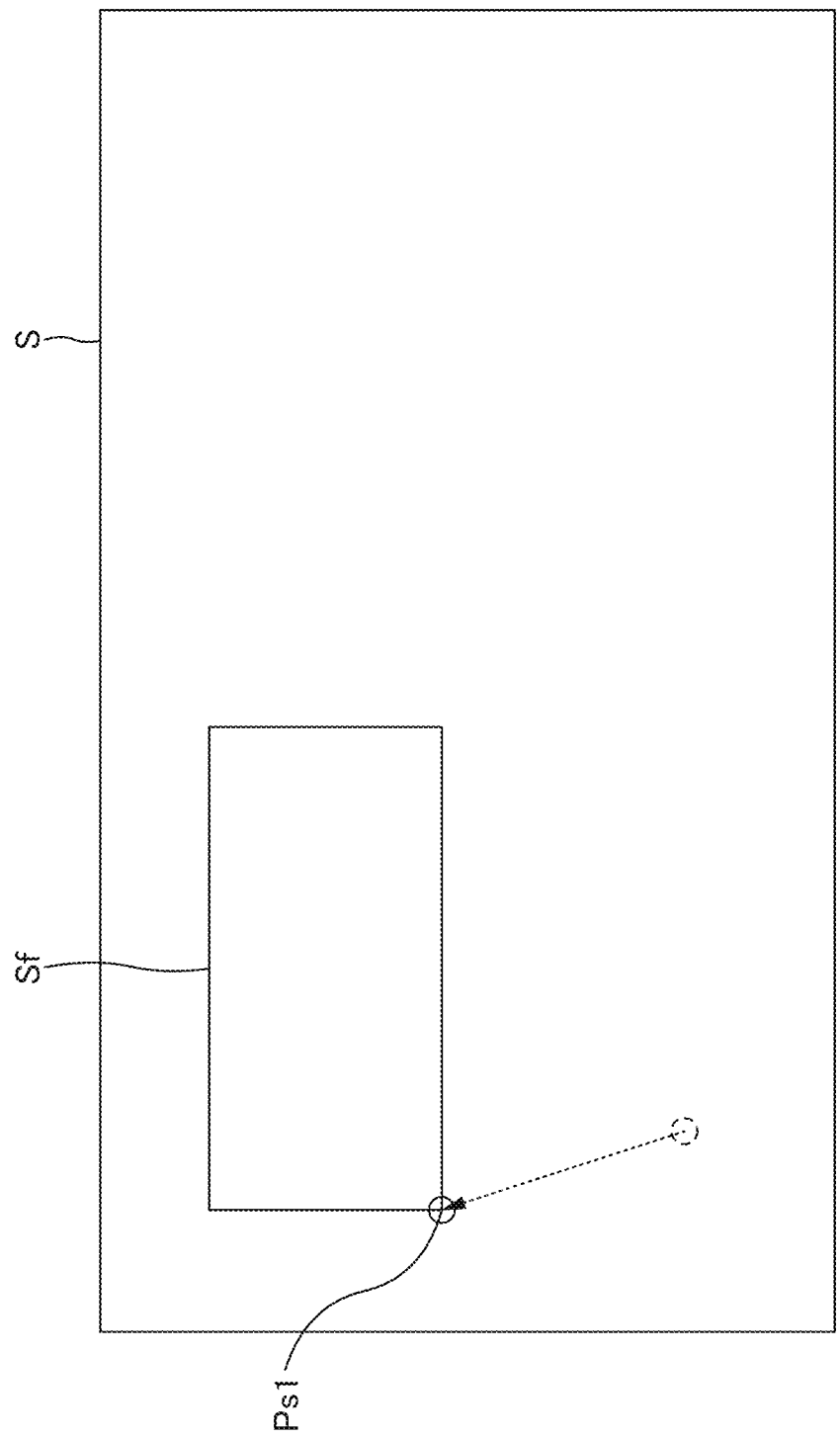
FIG. 8 is a diagram for explaining a machining method according to a preferred embodiment of the present invention.

In performing the machining method, the user chooses the workpiece S and loads it onto the holding unit 30 of the processor (loading of the workpiece; step 10). FIG. 7 is a diagram for explaining the workpiece S in the machining method according to this preferred embodiment. In this example, a rectangular character frame Sf is provided in advance on the surface of the workpiece S. The user makes/edits a character string or the like in the step of generating a figure data so that a desired character string is drawn inside the character frame Sf.

The step of generating a figure data (step 11) is to make/edit an intended figure in the computer 3 in response to a command input from the user. The step of generating a machining path data (step 12) is used to generate a machining path data in the CAM system 200 based on the intended figure that has been made/edited. The step of making a machining preview (step 13) is used to present, before actual machining, how the surface of the workpiece S is machined in the processor 1. The drawing step (step 14) is, in the processor 1, used to draw the intended figure on the surface of the workpiece S with the machining tool.

These steps are described in detail below.

The step of generating a figure data is described with reference to FIGS. 8 to 14. In the step of generating a figure data, the figure data generation program causes the computer 3 to execute the above-mentioned first to fifth processes.

First, the computer 3 executes the first process in response to a command input from the user and displays a drawing screen 3c on the display device 3a.

In this example, it is preferable that a position corresponding to the character frame Sf can be found in the drawing screen 3c so that a desired character string can be drawn at a desired position within the character frame Sf. This can be achieved by causing the computer 3 to execute the second and third processes.

In this example, the user designates a position Ps1 (the bottom left vertex of the character frame Sf) on the surface of the workpiece S. In response to the designation by the user, the computer 3 executes the second process and commands the processor 1 to project a beam of visible light to the predetermined position Ps1. In this example, the processor 1 displaces the position at which a beam of visible light is projected along the broken line, starting from the initial position and projects a beam of visible light onto the position Ps1 based on the command from the computer 3 (see FIG. 8).

Figure 9:
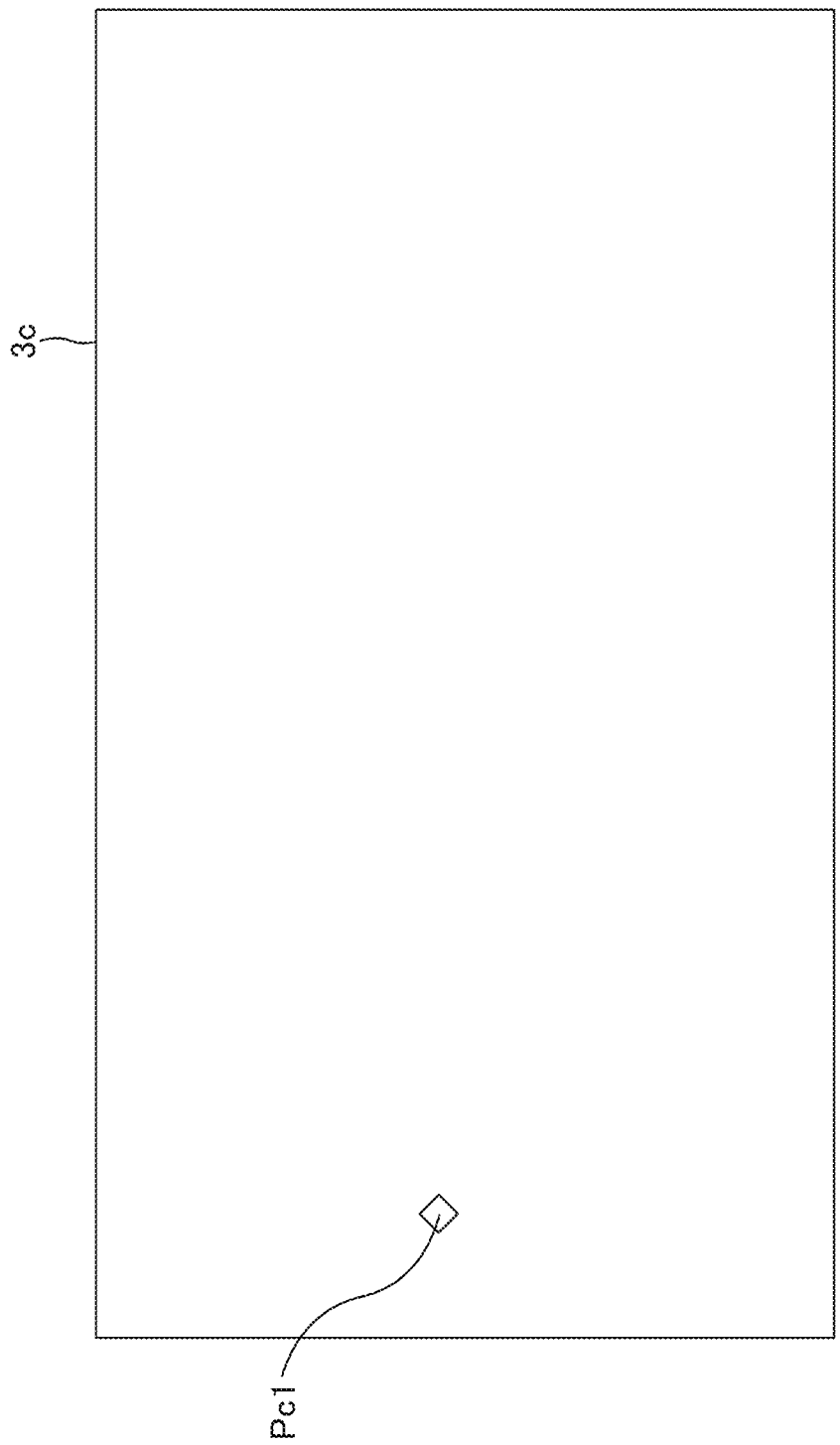
FIG. 9 is a diagram for explaining a machining method according to a preferred embodiment of the present invention.
Figure 10:
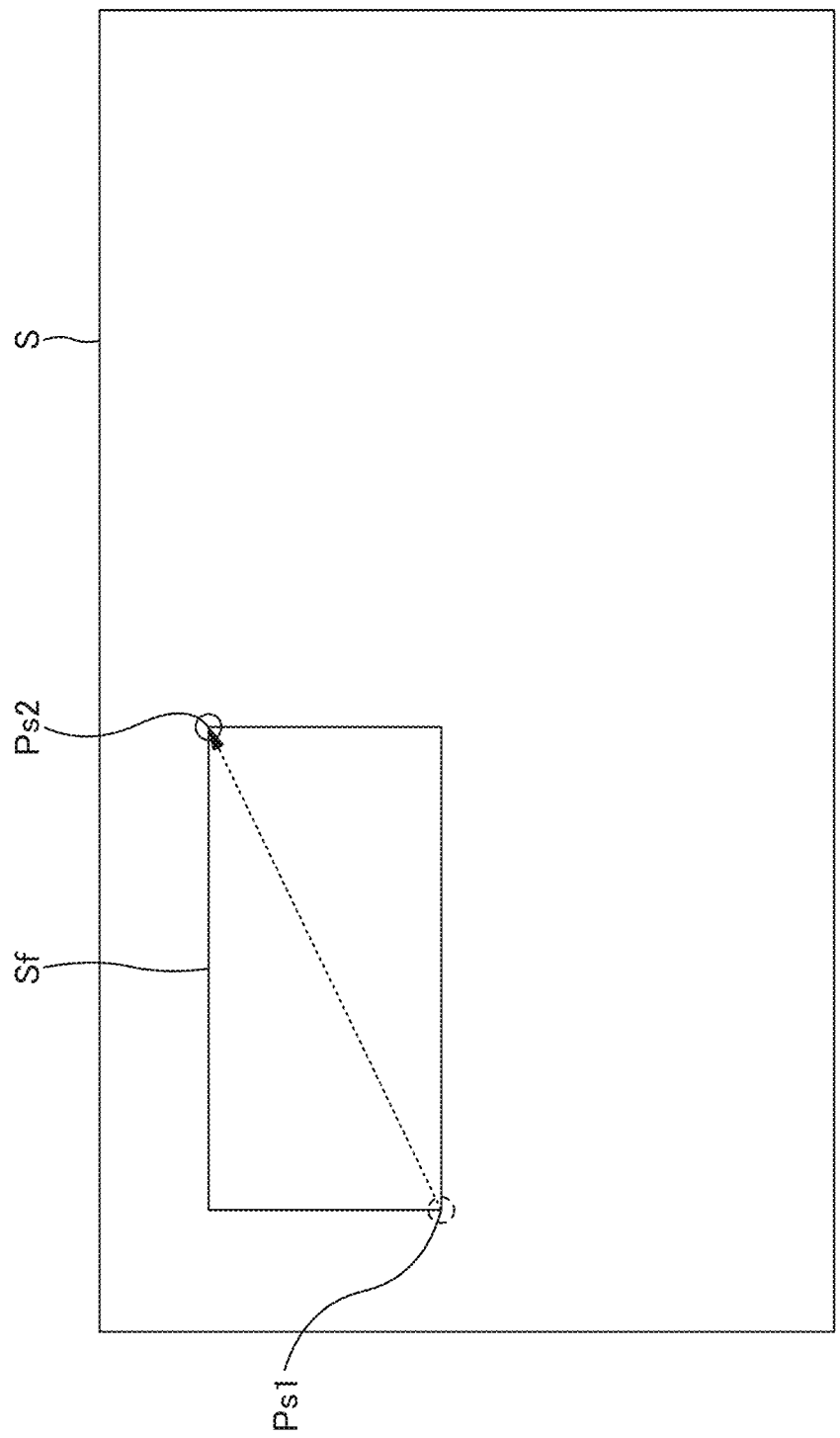
FIG. 10 is a diagram for explaining a machining method according to a preferred embodiment of the present invention.

In this state, when the user depresses one button B of the operation panel 2, the computer 3 executes the third process and presents a position Pc1 corresponding to the position Ps1 in the drawing screen 3c (see FIG. 9). In this example, the position Pc1 on the drawing screen 3c is presented with a diamond shape.

The user further designates a position Ps2 (the top right vertex of the character frame Sf) on the surface of the workpiece S. In response to the designation by the user, the computer 3 commands the processor 1 to project a beam of visible light onto the position Ps2. The processor 1 displaces the position at which a beam of visible light is projected and projects a beam of visible light onto the position Ps2 based on the command from the computer 3 (see FIG. 10).

Figure 11:
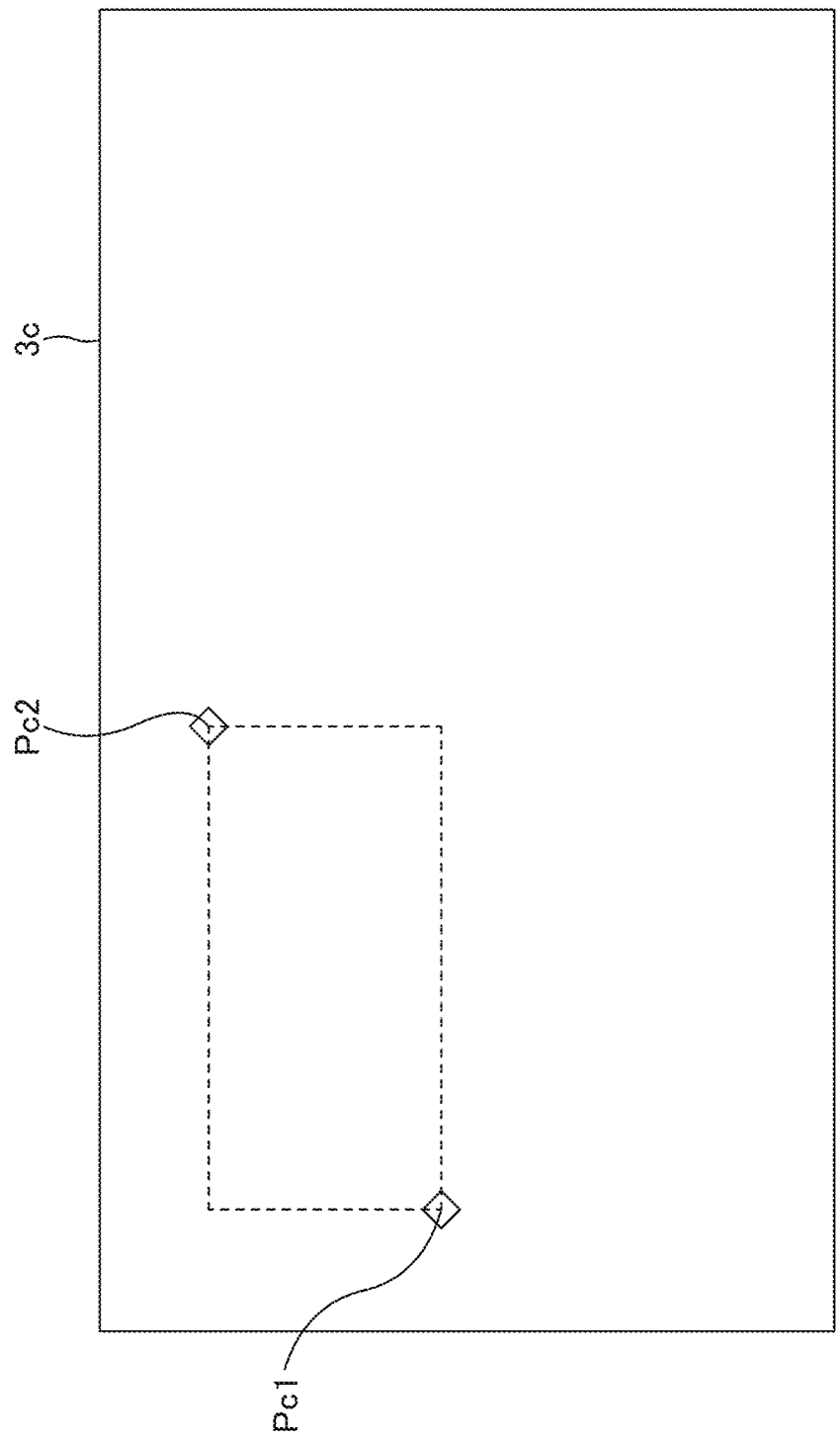
FIG. 11 is a diagram for explaining a machining method according to a preferred embodiment of the present invention.

In this state, when the user depresses one button of the operation panel 2, the computer 3 presents a position Pc2 corresponding to the position Ps2 on the drawing screen 3c (see FIG. 11).

It should be noted that, in FIG. 11, in the drawing screen 3c, the rectangle with its opposite vertices at the positions Pc1 and Pc2 is depicted by a broken line. This rectangle is defined based on the coordinates of the positions Pc1 and Pc2. Assuming that the coordinates of the positions Pc1 and Pc2 be (Xc1, Yc1) and (Xc2, Yc2), respectively, the rectangle has its vertices at (Xc1, Yc1), (Xc2, Yc1), (Xc2, Yc2), and (Xc1, Yc2). The computer 3 can present the position Pc2 and this rectangle at the same time. This rectangle corresponds to the character frame Sf that is provided in advance on the surface of the workpiece S.

Figure 12:
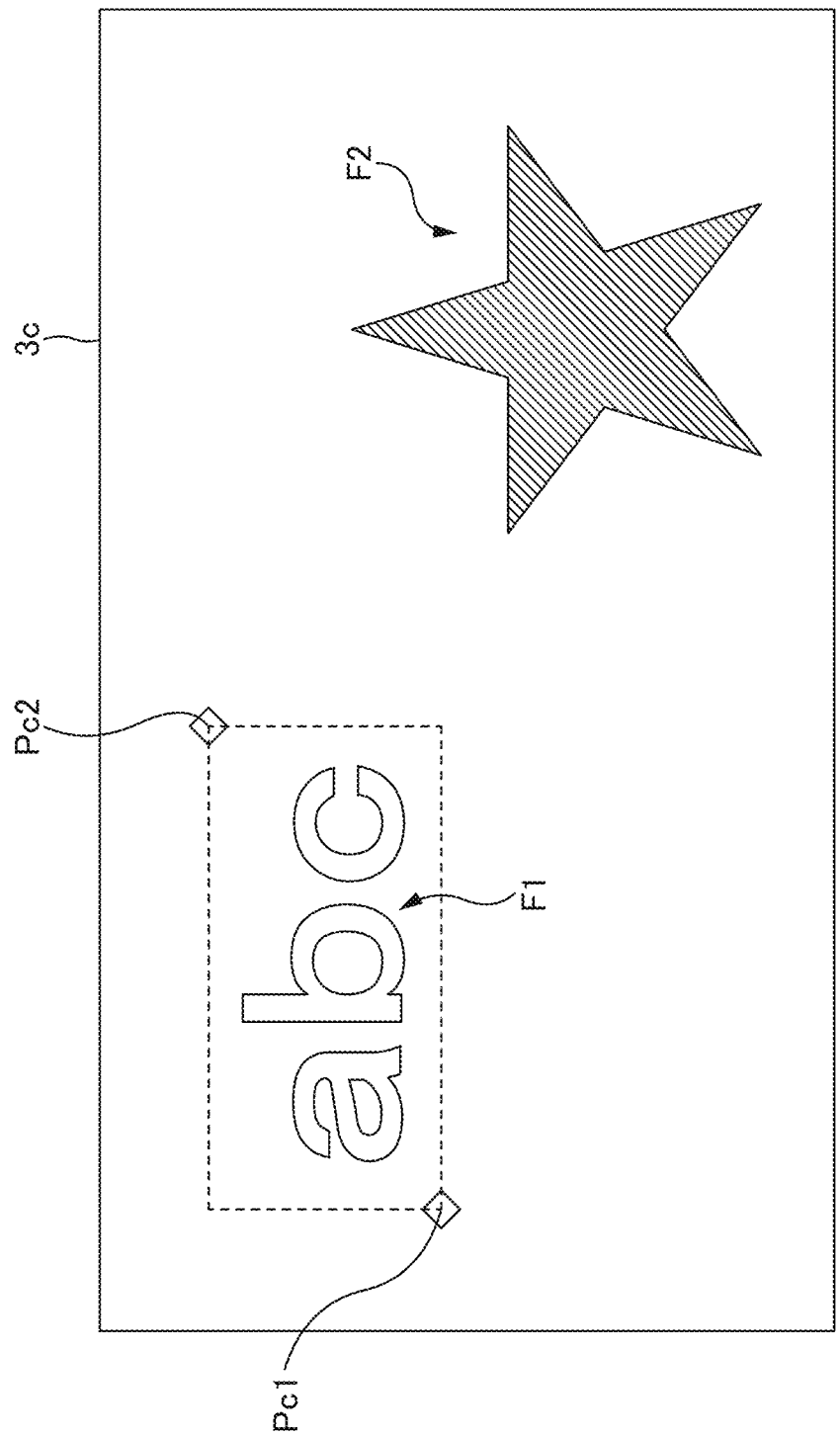
FIG. 12 is a diagram for explaining a machining method according to a preferred embodiment of the present invention.

In this way, after the positions Pc1 and Pc2 and the rectangle with its opposite vertices located at these positions are displayed on the drawing screen 3c, the user can make/edit an intended figure using them as references. FIG. 12 is an example of a shape made/edited via the drawing screen 3c. In FIG. 12, characters F1 has been made so that they are drawn within the character frame Sf, and a figure F2 has been made so that it is drawn outside the character frame Sf.

The description that has been made immediately above is focused on checking where a certain position on the surface of the workpiece S is located on the drawing screen 3c in making/editing a figure, by causing the computer 3 to execute the first to third processes. The other way around, it may be required to understand where a figure that has been made/edited is drawn on the surface of the workpiece S. In particular, it is preferable in this example that whether or not characters F1 are drawn at appropriate positions within the character frame Sf can be understood, on the surface of the workpiece S. This can be achieved by causing the computer 3 to execute the fourth and fifth processes.

Figure 13:
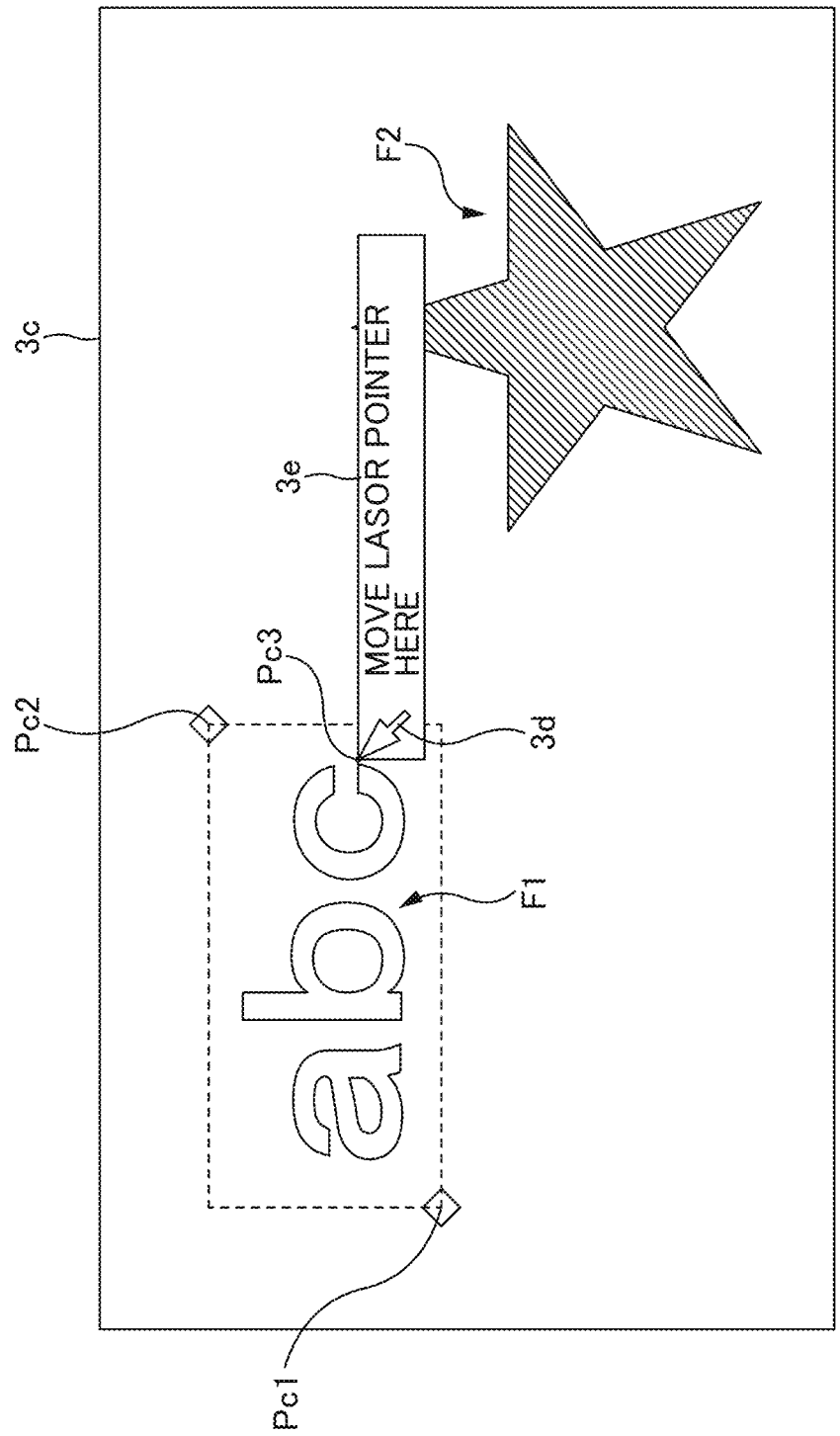
FIG. 13 is a diagram for explaining a machining method according to a preferred embodiment of the present invention.
Figure 14:
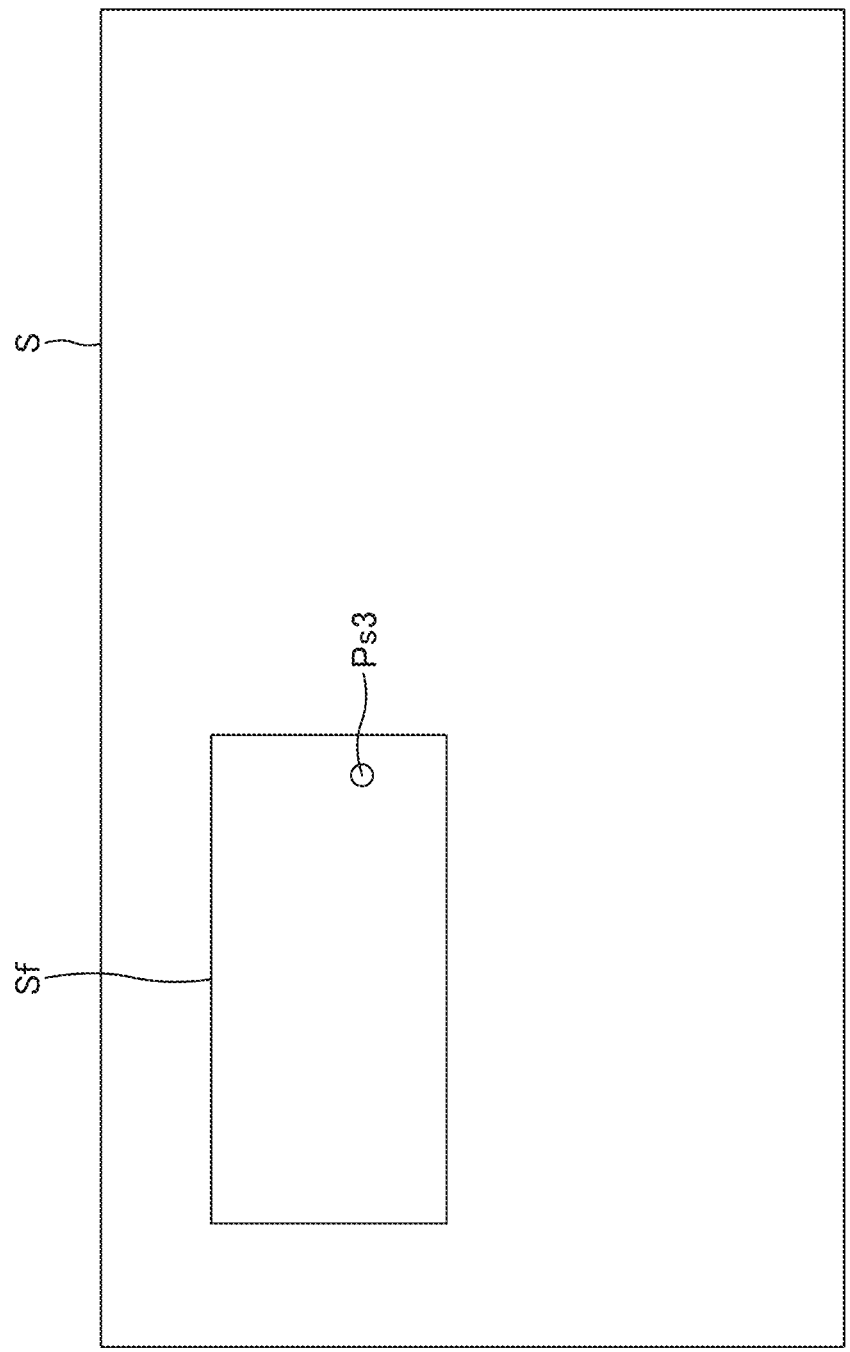
FIG. 14 is a diagram for explaining a machining method according to a preferred embodiment of the present invention.

In this example, first, the user designates a position Pc3 on the drawing screen 3c (see FIG. 13). In this example, the user designates the position Pc3 on the drawing screen 3c by moving a cursor 3d to the position Pc3 on the drawing screen 3c and depressing one button B (see FIG. 13). In this example of a preferred embodiment of the present invention, a dialog box 3e indicating "move a laser pointer to here" is displayed in response to the user's depressing one button B. In this case, the computer 3 executes the fourth process and detects the position Pc3 on the drawing screen 3c which has been designated by the user.

Then, in response to the user's clicking the displayed dialog box 3e, the computer 3 commands the processor 1 to project a beam of visible light onto a position Ps3 corresponding to the position Pc3, on the surface of the workpiece S. The processor 1 displaces the position at which a beam of visible light is projected, based on the command from the computer 3 and projects a beam of visible light to the position Ps3 (see FIG. 14). The user determines whether or not the position Pc3 on the drawing screen 3c corresponds to a desired position on the surface of the workpiece S by viewing the position Ps3 at which a beam of visible light is projected. If the user determines that the position Pc3 on the drawing screen 3c does not correspond to the desired position on the surface of the workpiece S, the user can edit the figure to change its size and position.

The computer 3 executes the first to fifth processes in response to a command from the user.

In the figure shown in FIG. 13, the characters F1 are a character string which is a sequence of alphabets "abc" of which kind information is "character string." In this case, the figure information is set such that, among those belonging to the attribute information for the characters F1, the "character ID" is abc, the "orientation" is landscape, the "font" is Gothic, and the "with or without fill" is "without." The figure F2 is a star-shaped figure of which kind information is "shape." The figure F2 is filled with diagonal hatching as shown in the drawing screen 3c in FIG. 13. In this case, the figure information is set such that, among those belonging to the attribute information for the figure F2, the "with or without fill" is "with." The computer 3 outputs the generated figure data to the CAM system 200.

Figure 15:
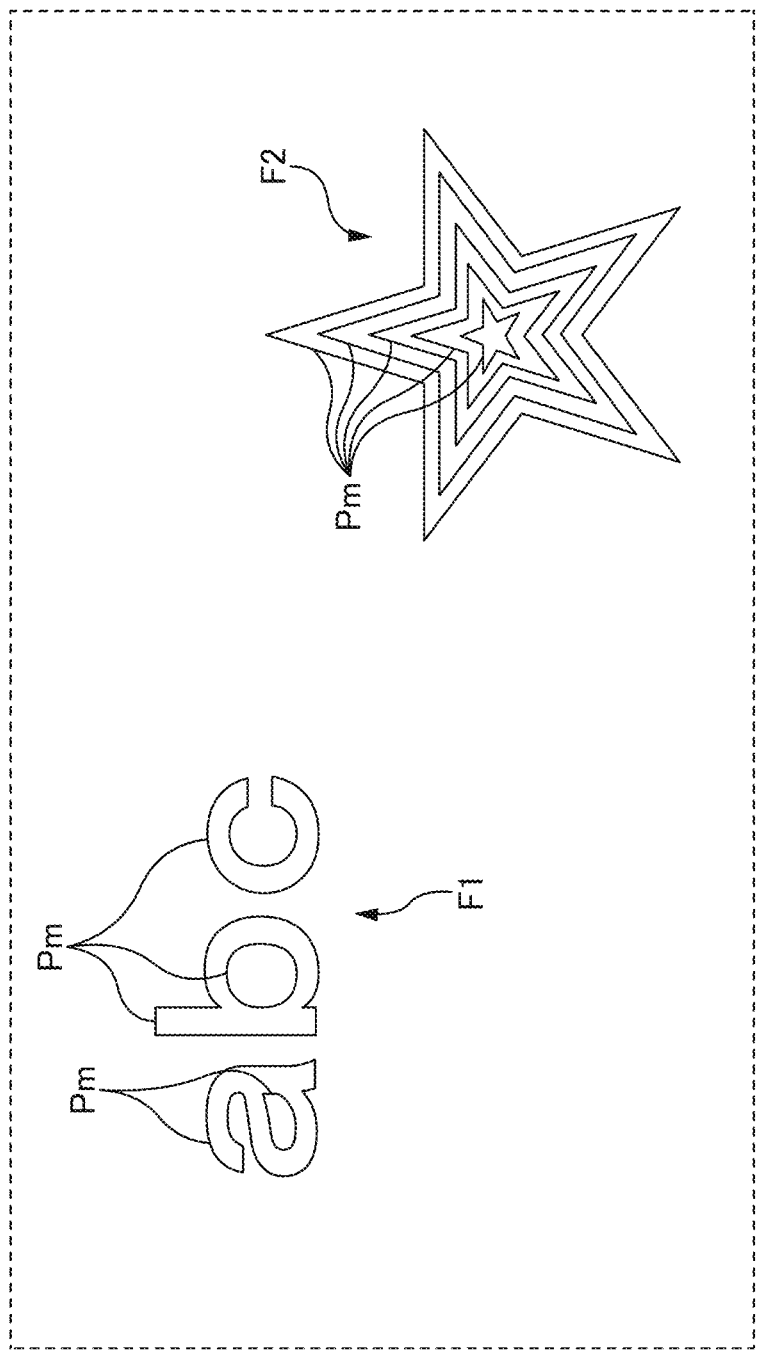
FIG. 15 is a diagram for explaining a machining method according to a preferred embodiment of the present invention.

Next, referring to FIG. 15, the step of generating a machining path data is described. At the step of generating a machining path data (step 12), a machining path data generation program causes the CAM system 200 to execute a step of generating a machining path data based on the figure data. Specifically, the CAM system 200 establishes a machining path for drawing a figure represented by the figure data. Then, the CAM system 200 generates a machining path data constituted of multiple point data by extracting multiple two-dimensional (XY) coordinates on the machining path that has been established.

In this example, "without" is set for the "with or without fill" which is one belonging to the attribute information for the characters F1. In this case, as shown in FIG. 15, machining paths Pm are established along the curves of each character. In addition, "with" is set for "with or without fill" which is one belonging to the attribute information for the figure F2. Thus, as shown in FIG. 15, multiple closed machining paths Pm that are established one inside another are assumed as the machining paths Pm. The outermost path out of the multiple closed machining paths Pm have been established along the contour of the figure F2. The multiple closed machining paths Pm are away from each other with a fixed distance between the adjacent machining paths Pm.

By the above-mentioned method, the machining path data for the figure can be generated. The CAM system 200 outputs the machining path data generated by using the above-mentioned method to the machining system 100.

Figure 16:
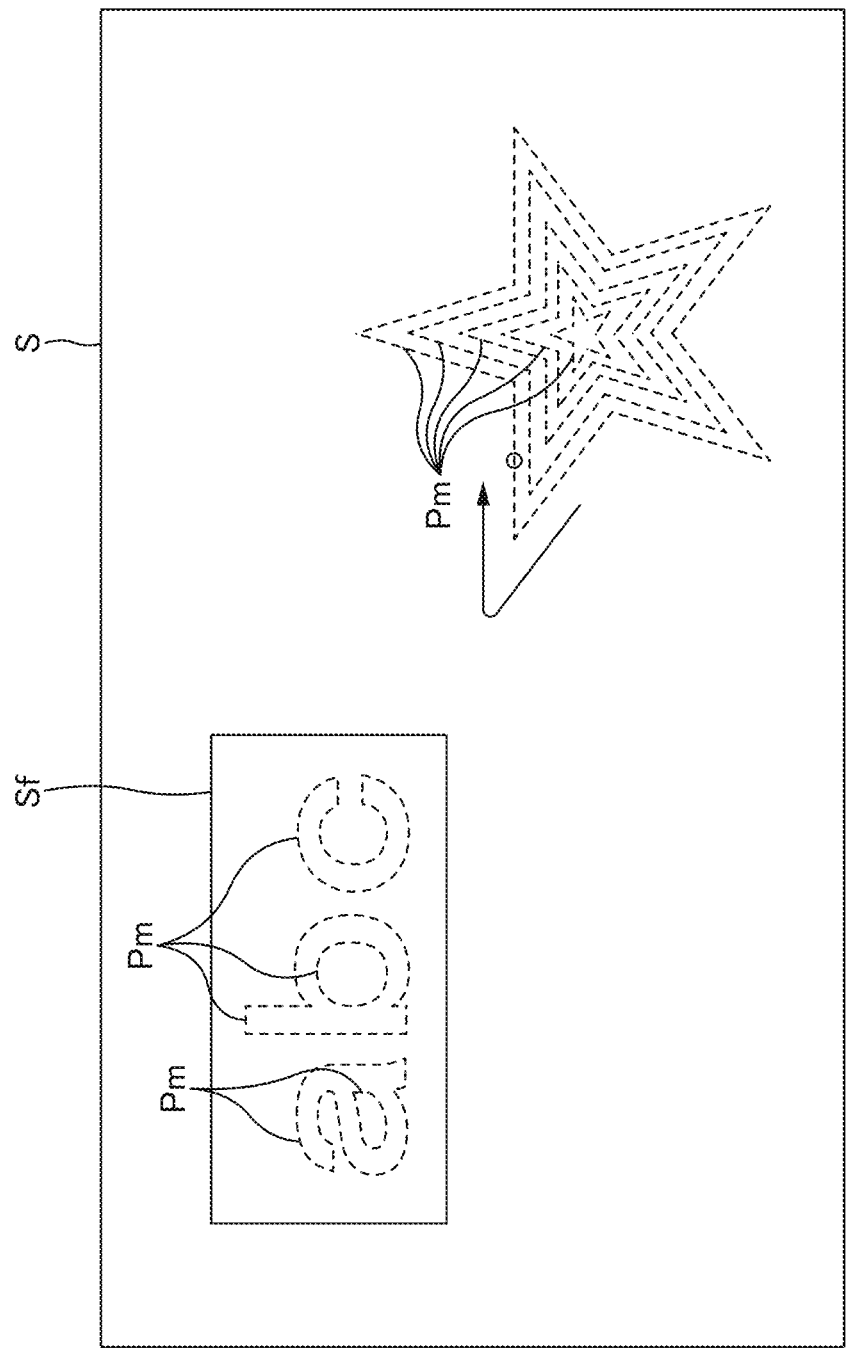
FIG. 16 is a diagram for explaining a machining method according to a preferred embodiment of the present invention.

Referring to FIG. 16, the step of making a machining preview is described. In the step of making a machining preview, the figure data generation program causes the computer 3 to execute the above-mentioned sixth process. The step of making a machining preview (step 13) is executed before the intended figure is drawn on the surface of the workpiece S at the drawing step (step 14).

In FIG. 16, the machining paths Pm are denoted by broken lines on the workpiece S. In this figure, the position at which a beam of visible light moving along a machining path Pm is projected is depicted by a white circle.

During the step of making a machining preview, the user can visually observe the position at which a beam of visible light moving along the machining path Pm is projected. With this, the user can preview the result of machining. In particular, the user can check whether or not the intended figure is to be drawn at a desired position on the surface of the workpiece S.

It should be noted that the step of making a machining presentation does not necessarily project a beam of visible light onto the entire machining path. For example, as to the figure F2, a machining path may be projected only along the outermost path of multiple closed machining paths Pm. Moreover, in the case that the user judges, midway through the course of the step of making a machining preview, that it is unnecessary to continue the machining preview, the machining preview can be ended at that point by manipulating the operation panel 2.

When the user judges, by the machining preview, that no error can be found in the machining result, the step of making a machining preview is ended.

Figure 17:
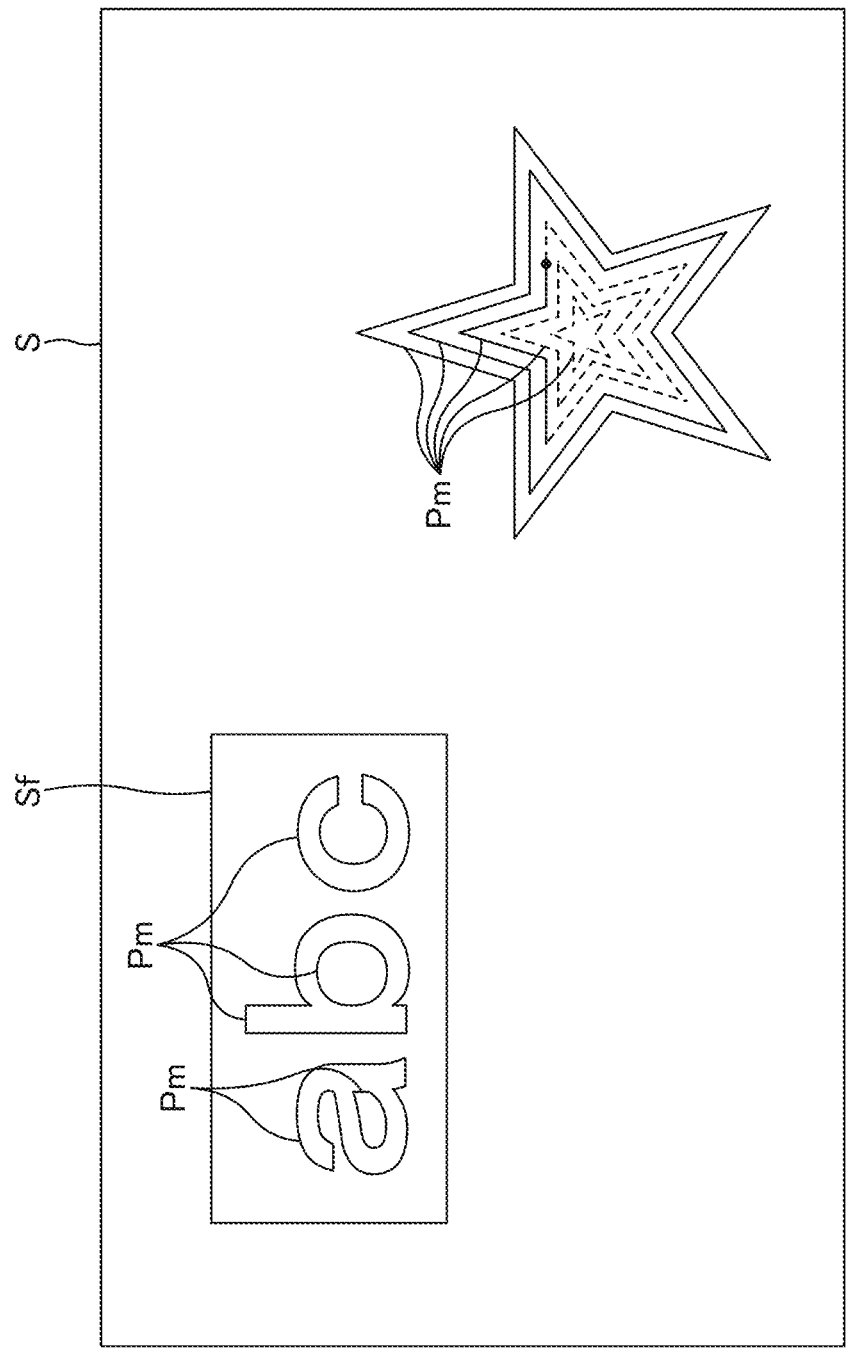
FIG. 17 is a diagram for explaining a machining method according to a preferred embodiment of the present invention.

Referring to FIG. 17, the drawing step is described. In the drawing step, a drawing program causes the computer 3 to execute a process of controlling the processor 1 based on the machining path data and drawing an intended figure on the surface of the workpiece S.

In FIG. 17, the machining paths Pm are shown on the workpiece S. In the machining paths Pm, the portions that have been machined by the machining tool T are depicted by solid lines and unprocessed ones are depicted by broken lines.

When the machining of all machining paths Pm has been made, the computer 3 causes the drawing step to be ended. The machining using the machining method according to this preferred embodiment is ended through the steps mentioned above.

The machining system 100, the CAM system 200, and the machining method according to this preferred embodiment have been described above. In this preferred embodiment, as the processor 1, the processor 1 that cuts the surface of the workpiece S with the machining tool T is used for the description. However, a processor that cuts the surface of the workpiece S using laser projections in place of the machining tool T can also be used. Accordingly, the machining path data according to this preferred embodiment can be applied to any of these machining methods.

In addition, this preferred embodiment has been described in terms of command inputs to the computer 3 that are made via the operation panel 2. However, the present invention is not limited thereto and some or all of the command inputs can be made via the input device 3b in place of the operation panel 2.

As described above, the figure data generation program according to this preferred embodiment causes the computer 3 to execute the first process of displaying the drawing screen 3c to make/edit an intended figure; the second process of commanding the processor 1 is used to draw the intended figure on a surface of the workpiece S to project visible light onto a predetermined position on the surface, the processor 1 having the visible-light source 20, the predetermined position having been designated by the user; and the third process of presenting a position corresponding to the predetermined position in the drawing screen 3c.

By operating the computer 3 using such a figure data generation program, it is possible to understand the correspondence between a predetermined position on the surface of the workpiece S which has been designated by the user and a position on the drawing screen 3c which corresponds to the predetermined position. Accordingly, it is possible to understand correspondences between positions on the drawing screen 3c to make/edit figures that are to be drawn on a surface of the workpiece S and positions on the surface of the workpiece S. This allows users to correctly draw a figure that has been made on the drawing screen 3c at a desired position and in a desired area on the surface of the workpiece S.

In addition, the figure data generation program according to this preferred embodiment causes the computer 3 to execute the first process of displaying the drawing screen 3c to make/edit an intended figure; the fourth process of detecting a predetermined position in the drawing screen 3c, the predetermined position having been designated by the user; and the fifth process of commanding the processor 1 to draw the intended figure on a surface of the workpiece S to project visible light onto a position corresponding to the predetermined position, on the surface, the processor 1 including the visible-light source 20.

By operating the computer 3 using such figure data generation program, it is possible to understand the correspondence between a predetermined position on the drawing screen 3c which has been designated by the user and a position on the surface of the workpiece S which corresponds to the predetermined position. Accordingly, it is possible to understand correspondences between positions on the drawing screen 3c to make/edit figures that are to be drawn on a surface of the workpiece S and positions on the surface of the workpiece S. This allows users to correctly draw a figure that has been made on the drawing screen 3c at a desired position and in a desired area on the surface of the workpiece S.

Furthermore, the figure data generation program according to this preferred embodiment causes the computer 3 to execute the first process of displaying the drawing screen 3c to make/edit an intended figure; the second process of commanding the processor 1 to draw the intended figure on a surface of the workpiece S to project visible light onto a predetermined position on the surface, the processor 1 including the visible-light source 20, the predetermined position having been designated by the user; the third process of presenting a position corresponding to the predetermined position on the surface, in the drawing screen 3c; the fourth process of detecting a predetermined position in the drawing screen 3c, the predetermined position having been designated by the user; and the fifth process of commanding the processor 1 to project visible light onto a position corresponding to the predetermined position in the drawing screen 3c, on the surface.

By operating the computer 3 using such figure data generation program, it is possible to find a position on the drawing screen 3c which corresponds to a predetermined position on the surface of the workpiece S which has been designated by the user. Furthermore, it is possible to find a position on the surface of the workpiece S which corresponds to a predetermined position on the drawing screen 3c which has been designated by the user. This makes it possible to understand correspondences between positions on the drawing screen 3c to make/edit figures that are to be drawn on a surface of the workpiece S and positions on the surface of the workpiece S.

Moreover, the figure data generation program according to this preferred embodiment causes the computer 3, before an intended figure is drawn on a surface of the workpiece S by the processor 1, to execute a process of commanding the processor 1, such that a machining preview of at least a part of the intended figure is made by causing visible light to be projected onto a position at which at least a part of the intended figure is drawn.

By operating the computer 3 using such figure data generation program, it is possible to know in advance the shape and position of figures that are drawn on a surface of the workpiece S before the drawing step.

It is also possible to supply a program to a computer using a non-transitory computer readable medium with an executable program thereon, in which the machining program of the above-mentioned preferred embodiment is stored. Examples of the non-transitory computer readable medium include magnetic storage media (e.g. flexible disks, magnetic tapes, and hard disk drives), and CD-ROMs (read only memories).

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A non-transitory computer-readable medium including a figure data generation program to cause a computer to execute:
   a first process of displaying a drawing screen to make/edit an intended figure;
   a second process of commanding a processor to project a visible light onto a predetermined position on the surface, the processor including a visible-light source, the predetermined position having been designated by a user; and
   a third process of presenting a position corresponding to the predetermined position in the drawing screen, wherein
   the processor is configured to draw the intended figure on a surface of a workpiece, and
   before the intended figure is drawn on a surface of the workpiece by the processor, the computer executes a sixth process of commanding the processor to make a machining preview of at least a part of the intended figure, by projecting a visible light onto a position at which at least a part of the intended figure is drawn.

2. A non-transitory computer-readable medium including a figure data generation program to cause a computer to execute:
   a first process of displaying a drawing screen to make/edit an intended figure;
   a fourth process of detecting a predetermined position in the drawing screen, the predetermined position having been designated by a user; and
   a fifth process of commanding a processor to project a visible light onto a position corresponding to the predetermined position, on the surface, the processor including a visible-light source, wherein
   the processor is configured to draw the intended figure on a surface of a workpiece, and
   before the intended figure is drawn on a surface of the workpiece by the processor the computer executes a sixth process of commanding the processor to make a machining preview of at least a part of the intended figure, by projecting a visible light onto a position at which at least a part of the intended figure is drawn.

3. The non-transitory computer-readable medium including the figure data generation program according to claim 2, wherein:
   the predetermined position is a single point that is detected as coordinates on the drawing screen.

4. A non-transitory computer-readable medium including a figure data generation program to cause a computer to execute:
   a first process of displaying a drawing screen to make/edit an intended figure;
   a second process of commanding a processor to project a visible light onto a predetermined position on the surface, the processor including a visible-light source, the predetermined position having been designated by a user;
   a third process of presenting a position corresponding to the predetermined position on the surface, in the drawing screen;
   a fourth process of detecting a predetermined position in the drawing screen, the predetermined position having been designated by a user; and
   a fifth process of commanding the processor to project a visible light onto a position corresponding to the predetermined position in the drawing screen, on the surface, wherein
   the processor is configured to draw the intended figure on a surface of a workpiece, and
   before the intended figure is drawn on a surface of the workpiece by the processor the computer executes a sixth process of commanding the processor to make a machining preview of at least a part of the intended figure, by projecting a visible light onto a position at which at least a part of the intended figure is drawn.

* * * * *